United States Patent [19]

Bossel

[11] Patent Number: 4,997,727
[45] Date of Patent: Mar. 5, 1991

[54] STACK OF FLAT, PLANE HIGH-TEMPERATURE FUEL CELLS ASSEMBLED INTO A STACK

[75] Inventor: Ulf Bossel, Baden, Switzerland

[73] Assignee: Asea Brown Boveri AG, Baden, Switzerland

[21] Appl. No.: 522,596

[22] Filed: May 14, 1990

[51] Int. Cl.⁵ .............................................. H01M 8/10
[52] U.S. Cl. ......................................... 429/33; 429/35
[58] Field of Search .................... 429/30, 33, 34, 35, 429/12, 36

[56] References Cited
U.S. PATENT DOCUMENTS 4,450,212  5/1984  Feigenbaum et al. ............ 429/36 X
4,604,331  8/1986  Louis ................................... 429/35
4,751,153  6/1988  Roth .................................... 429/35
4,943,495  7/1990  Okada et al. ........................ 429/35
4,950,562  8/1990  Yoshida et al. ..................... 429/32

Primary Examiner—Anthony Skapars
Attorney, Agent, or Firm—Oblon, Spivak, McClelland, Maier & Neustadt

[57] ABSTRACT

A stack of high-temperature fuel cells which include a ceramic solid electrolyte, a porous oxygen electrode and a porous fuel electrode with gas-tight separation plates placed between the cells, wherein the separation plates, in their plane, exhibit knobs on both sides for electrical contact and include, on their edge, oxygen-side and fuel-side sealing edges whose planes are perpendicular to the plate plane.

3 Claims, 2 Drawing Sheets

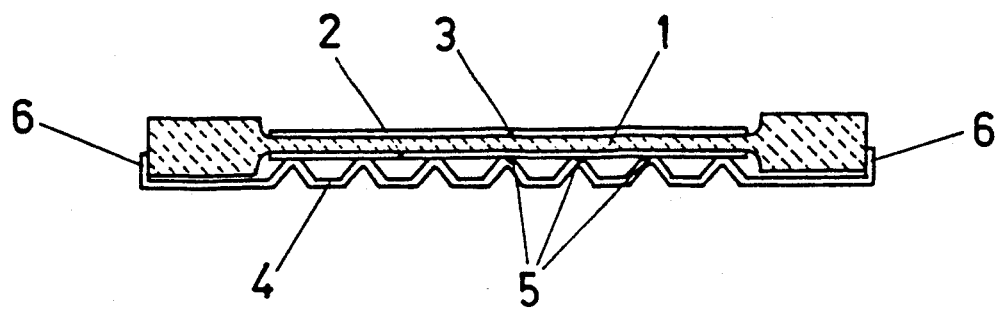
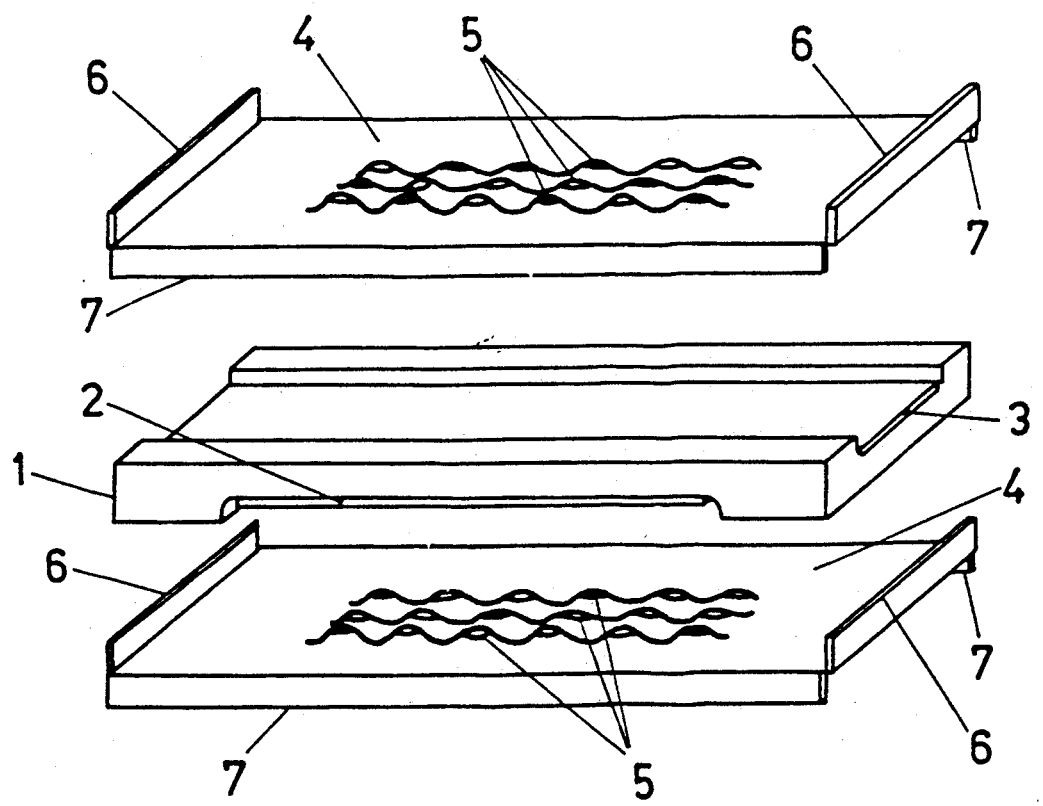

STACK OF FLAT, PLANE HIGH-TEMPERATURE FUEL CELLS ASSEMBLED INTO A STACK

BACKGROUND OF THE INVENTION

1. Field of the Invention

The invention is directed to high-temperature fuel cells for converting chemical energy into electrical energy and relates (1) to the development of electrochemical high-temperature cells using ceramic solid electrolytes as ion conductors, wherein the cells are to a great extent independent of the fuel used and guarantee a compact arrangement and also relates (2), in a narrower sense, to an arrangement, of a multiplicity of flat, planar high-temperature fuel cells assembled into a stack, connected in series, and utilizing zirconium oxide as the solid electrolyte with electrically conductive separation plates placed between the cells.

2. Discussion of the Background

High-temperature fuel cells using doped, stabilized zirconium oxide are known to have numerous embodiments. In flat, planar fuel cells that are lined up into stacks ("filter press principle"), frame-like seals are definitely necessary to be provided on the outer periphery of the plate-shaped elements to press the interconnected components (e.g., bipolar plate, separation plate, current collector), which act to transmit the current perpendicular to the plate plane, on the adjacent electrodes and to guarantee perfect contact. As a rule, these electrically insulating, frame-like seals are made so that their main planes lie parallel to the plate plane of the adjacent element.

This layering of fuel cells, separation plates and flat, frame-like seals leads to a repeatedly statically indeterminate system which is difficult to control in practice. Either the contact pressure of the parts that are to guarantee the electrical contact is found to be insufficient or the pressure on the seal is insufficient for gas-tight closure. In addition, these flat seals make the feeding and removal of the gaseous media at the edges of the plate-shaped fuel cells more difficult and lead to an expensive structural configuration.

The following publications and patents are known prior art:

O. Antonsen, W. Baukal and W. Fischer, "Hochtemperatur-Brennstoffbatterie mit keramischem Elektrolyten" ["High-temperature Fuel Battery with Ceramic Electrolyte"], Brown Boveri Mitteilungen [Information] January/February 1966, pages 21-30, U.S. Pat. No. 4,692,274

U.S. Pat. No. 4,395,468

W. J. Dollard and W. G. Parker, "An Overview of the Westinghouse Electric Corporation Solid Oxide Fuel Cell Program," Extended Abstracts, Fuel Cell Technology and Applications, International Seminar, The Hague, Netherlands, Oct. 26 to 29, 1987, F. J. Rohr, High Temperature Fuel Cells, Solid Electrolytes, 1978 by Academic Press, Inc., page 431 ff, D. C. Fee et al., Monolithic Fuel Cell Development, Argonne National Laboratory, paper presented at the 1986 Fuel Cell Seminar, Oct. 26-29, 1986, Tucson, Ariz, U.S. Department of Energy, the University of Chicago.

The previously known arrangements of fuel cells and components placed between them are unsatisfactory in practice in many respects. Therefore, there is a great need to create more definite and simpler conditions with respect to statics, thermal expansion and manufacturing technology.

SUMMARY OF THE INVENTION

The present invention is based on the object of producing an arrangement of planar high-temperature fuel cells on the basis of utilizing zirconium oxide as a solid electrolyte with gas-tight, electrically conductive separating plates placed between the cells, an arrangement that provides statically definite conditions with respect to the contact pressures at the contact points between a bipolar plate and adjacent, opposite electrodes and that guarantees complete sealing of the individual components from one another. Further, by suitable measures relating to design and materials technology, the lateral feeding and removal of gaseous media at the edges of the fuel cells is made easier and the overall arrangement is simplified and made more reliable.

This object is achieved in that, in the above-mentioned arrangement, the sealing of adjacent, plate-shaped components on their periphery is performed in planes that are perpendicular to the plane of the plate, and simultaneously, by lateral overlapping of the edge parts of the components, centering of the latter from one another is guaranteed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an elevational section view through a fuel cell and the adjacent separation plate (i.e. a bipolar plate);

FIG. 2 is a perspective representation of a fuel cell and each adjacent separation plate in an exploded state;

DESCRIPTION OF THE PREFERRED EMBODIMENTS

Figure 3:
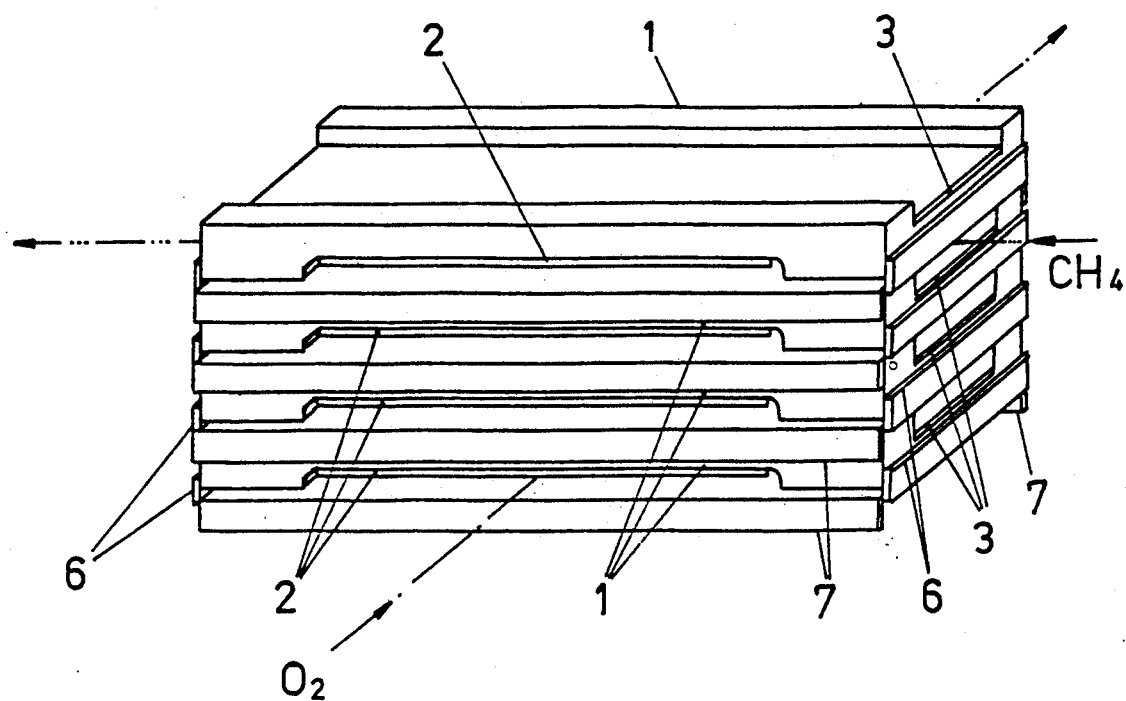
FIG. 3 is a perspective representation of a stack consisting of a multiplicity of fuel cells and separation plates.

FIG. 1 represents an elevational sectional view through a fuel cell and the adjacent separation plate (i.e., bipolar plate), wherein the actual planar, flat fuel cell made of ceramic material consists of a solid electrolyte 1 (doped, stabilized $ZrO_2$), a porous (positive) oxygen electrode 2 made of La/Mn perovskite and a porous (negative) fuel electrode 3 made of $Ni/ZrO_2$ cermet. Reference number 4 indicates a gas-tight, electrically conductive separation plate (i.e. a bipolar plate 4) provided with knobs or ribs 5. In a sectional view, a corrugated shape is obtained. Bipolar plate 4 consists preferably of a heat-resistant, corrosion and oxidation-resistant high-temperature material, for example of a nickel-based superalloy. On the outer periphery, bipolar plate 4 is beveled at a right angle on two opposite sides in one direction, on the two sides perpendicular to this in the other direction. In the elevational sectional view of FIG. 1, an oxygen-side sealing edge 6 of bipolar plate 4 is visible.

FIG. 2 shows a perspective representation of a fuel cell and both adjacent separation plates in an exploded state in the direction perpendicular to the plane of the plate. The fuel cell consists of ceramic solid electrolyte 1 in the form of a plate provided on both sides with a flat groove. The grooves are arranged crosswise and are laid out with the electrodes. The oxygen electrode 2 is placed underneath and the fuel electrode 3 is attached on top. The gas-tight, electrically conductive separation or bipolar plate 4 exhibits a multiplicity of rib knobs 5 oriented toward the opposite electrode and effect the contact. Reference number 6 indicates the upwardly oriented, oxygen side sealing edge, running on the edge, of bipolar plate 4 and reference number 7 represents the corresponding, downwardly oriented fuel-side sealing edge. This structure achieves a mutual interleaving of adjacent components, thus guaranteeing their centering in the plate plane.

FIG. 3 is a perspective representation of a stack consisting of a multiplicity of fuel cells and separation plates. This figure in fact represents the finally assembled components in the installed state. The reference numbers are exactly the same as indicated for FIG. 2. The mutual interleaving of sealing edges 6 and 7 with the adjacent fuel cells can clearly be seen. The flow directions for the gaseous media (symbols $O_2$ or $CH_4$) are marked by arrows and dot-dash lines.

Figure 4:
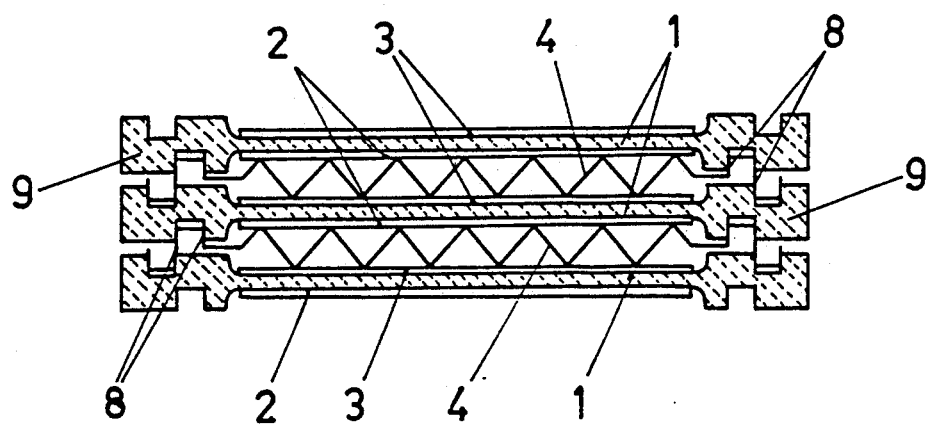
FIG. 4 is an elevational sectional view through a stack of fuel cells and separation plates.

FIG. 4 represents a elevational sectional view through a stack of fuel cells and separation plates. The actual fuel cell consists of a centrally placed, ceramic solid electrolyte 1 in plate form, which exhibits, on both sides, flat recesses into which electrodes 01 (oxygen side) and 3 (fuel side) are inserted. The plate of solid electrolyte 1 is made thicker on the periphery 9 and exhibits grooves with a rectangular profile extending around it on all sides. A gas-tight separation plate or bipolar 4, illustrated as a zig-zag line, has a sealing edge 8 of a labyrinth arrangement that engages the grooves of periphery 9 of solid electrolyte 1. Because several vertical surfaces of sealing edge 8 are connected in series in a transverse direction, an especially effective seal is achieved for the gaseous media. Further, centering of the components that is practically without play in a lateral direction is guaranteed.

The first embodiment is illustrated in FIGS. 1 and 2. The base element used here is a ceramic solid electrolyte 1 consisting of $ZrO_2$ stabilized with $Y_2O_3$ in the form of a thin, square plate. The thickness of the plate was 0.5 mm; its edge length being 50 mm. The solid electrolyte 1 was coated on one side with a porous oxygen electrode 2 made of La/Mn perovskite 50 micrometers in thickness and provided on the other side with a porous fuel electrode 3 made of $Ni/ZrO_2$ cermet having a thickness of 40 micrometers.

Gas-tight, electrically conductive separation or bipolar plates 4 were made of a heat-resistant nickel alloy with the trade name "Inconel X." The alloy had the following composition:

Cr = 15.0% by weight
Ti = 2.5% by weight
Al = 0.7% by weight
Nb = 1.0% by weight
Fe = 7.0% by weight
Si = 0.4% by weight
Mn = 0.5% by weight
C = 0.04% by weight
Ni = the rest The separation plates 4, made by deep drawing from one sheet, had a thickness of 0.5 mm and were provided with knobs or ribs 5 on both sides so as to be like an egg carton in shape. Knobs 5 had a height of 2 mm on the oxygen side, a height of 1 mm on the fuel side and a center-to-center distance in the plate plane of 7 mm. By beveling the edges during deep drawing, sealing edges 6 on the oxygen side were made so as to be 3 mm in height above the plate plane and the fuel side sealing edges 7 were made so as to be 2 mm in height above the plate plane. Beveling was performed so that the plane inside surfaces of sealing edges 6 and 7 enclosed an angle of less than 90° with the respective plate plane of separation plate 4. In this manner, springy elements were made in which it was possible to tightly insert the plate, consisting of solid electrolyte 1 and electrodes 2 and 3, without play. A plurality of these components were assembled into a stack as shown in FIG. 3. Testing resulted in a demonstration of sufficient sealing between oxygen and fuel side as well as relative to the surroundings.

In the second embodiment shown in FIG. 4, a planar plate made of a ceramic solid electrolyte 1 ($ZrO_2$ stabilized with $Y_2O_3$) was used as the shape-determining element. The square plate had a side length of 60 mm, a middle thickness of 0.5 mm and, on the 7.5 mm-wide edges, a thickness of 2 mm. Offset grooves which were 1.4 mm-wide and 0.8 mm deep were made in the edges by mechanical processing on both sides to form grooved periphery 9. The 0.5 mm-thick, active middle part of the solid electrolyte was coated with an oxygen electrode 2 and a fuel electrode 3, each electrode being 60 micrometers thick according to the first embodiment. Separation plate 4, consisting of "Inconel X" as in the first embodiment, consisted of a sheet measuring 60×60 mm overall and 0.4 mm thick. This was provided with sealing edges 8 of a labyrinth arrangement. The grooves and projections, made by beveling and deep drawing, of sealing edges 8 fit exactly in grooved periphery 9 of the solid electrolyte 1. In this case, the separation plate 4 was formed by pressing and deep drawing into the corrugated shape (i.e. having channels and projections) with a weight of 2 mm and a 4 mm center-to-center distance with respect to the plate plane. After assembly into a stack, the whole assembly was subjected to a test for leaks. At pressure differences of 0.5 bars, no significant leak current of a gaseous media could be detected.

The invention is not limited to the examples of the first and second embodiments.

The device of the present invention consists basically of an arrangement of a plurality of flat, planar high-temperature fuel cells 1, 2, 3 assembled into a stack, connected in series, and is based on the use of zirconium oxide as solid electrolyte 1 with gas-tight, electrically conductive separation plate 4 being placed between the cells and the sealing of adjacent plate-shaped components 1, 2, 3, 4 and their periphery is positioned in planes that are perpendicular to the plate plane and wherein simultaneously, by lateral overlapping of edge parts of the components, centering of the components with one another is guaranteed. Preferably, separation plate 4 is provided on two opposite sides with oxygen-side sealing edges 6 and, on the two opposite sides perpendicular to them, with fuel-side sealing edges 7, which overlap adjacent fuel cells 1, 2, 3 and exhibit contact surfaces that are common with the edge parts of the fuel cells and that lie tightly against one another.

In the second embodiment, separation plate 4 exhibits on each of two opposite sides a sealing edge 8 of a labyrinth arrangement, and ceramic solid electrolyte 1 is provided on the periphery on both sides with grooves 9 in which sealing edge 8 of separation plate 4 engages and guarantees lateral sealing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A stack of flat, planar high-temperature fuel cells, which comprises:
   a plurality of fuel cells connected in series and which include a zirconium oxide solid electrolyte;
   gas-tight, electrically conductive separation plates placed between the cells; and
   means for sealing of adjacent, plate-shaped components of said cells on the periphery thereof in planes that are perpendicular to the plane of each of the plates, and simultaneously, by lateral overlapping edge portions of the components for centering of the components with respect to one another.

2. A stack of fuel cells according to claim 1, wherein each of said separation plates comprises first and second opposite sides with oxygen-side sealing edges and third and fourth opposite sides which are perpendicular to said first and second opposite side and which include fuel-side sealing edges that overlap adjacent fuel cells and contact surfaces that are common with edge portions of the fuel cells and lie tightly against one another.

3. Arrangement according to claim 1, wherein each of the separation plates includes, on each of first and second opposite sides, a sealing edge of a labyrinth form and wherein said solid electrolyte comprises a ceramic material and is provided along the periphery on two sides with groove members with which a sealing edge of the separation plates respectively engage for lateral sealing.

* * * * *